(12) United States Patent  
Quioc

(10) Patent No.: US 8,240,709 B1  
(45) Date of Patent: Aug. 14, 2012

(54) MULTI-CHAMBER GAS GENERATING SYSTEM

(75) Inventor: Eduardo L. Quioc, Westland, MI (US)

(73) Assignee: TK Holdings, Inc., Armada, MI (US)

( * ) Notice: Subject to any disclaimer, the term of this patent is extended or adjusted under 35 U.S.C. 154(b) by 208 days.

(21) Appl. No.: 12/791,155

(22) Filed: Jun. 1, 2010

Related U.S. Application Data

(60) Provisional application No. 61/217,272, filed on May 29, 2009.

(51) Int. Cl.  
*B60R 21/26* (2011.01)

(52) U.S. Cl. ......................................... 280/741; 280/742

(58) Field of Classification Search .................. 280/740, 280/741, 742  
See application file for complete search history.

(56) References Cited

U.S. PATENT DOCUMENTS

| | | | | |
|---|---|---|---|---|
| 7,052,040 | B2 * | 5/2006 | Matsuda et al. | 280/741 |
| 7,125,041 | B2 * | 10/2006 | Kato et al. | 280/736 |
| 7,172,214 | B2 * | 2/2007 | Matsuda et al. | 280/741 |
| 7,267,365 | B2 * | 9/2007 | Quioc | 280/736 |
| 7,578,522 | B2 * | 8/2009 | Hanano et al. | 280/740 |
| 7,597,353 | B2 * | 10/2009 | Smith et al. | 280/736 |
| 7,784,829 | B2 * | 8/2010 | Hirooka et al. | 280/741 |

* cited by examiner

*Primary Examiner* — Toan To  
(74) *Attorney, Agent, or Firm* — L.C. Begin & Associates, PLLC

(57) ABSTRACT

A gas generating system includes an outer housing portion defining a chamber therein, an end closure coupled to the housing portion to close the chamber, and a resilient seal positioned between the housing portion and the end closure to seal the chamber. The system is configured to permit a flow of pressurized gas from the chamber to an exterior of the outer housing portion along at least a portion of the seal.

18 Claims, 4 Drawing Sheets

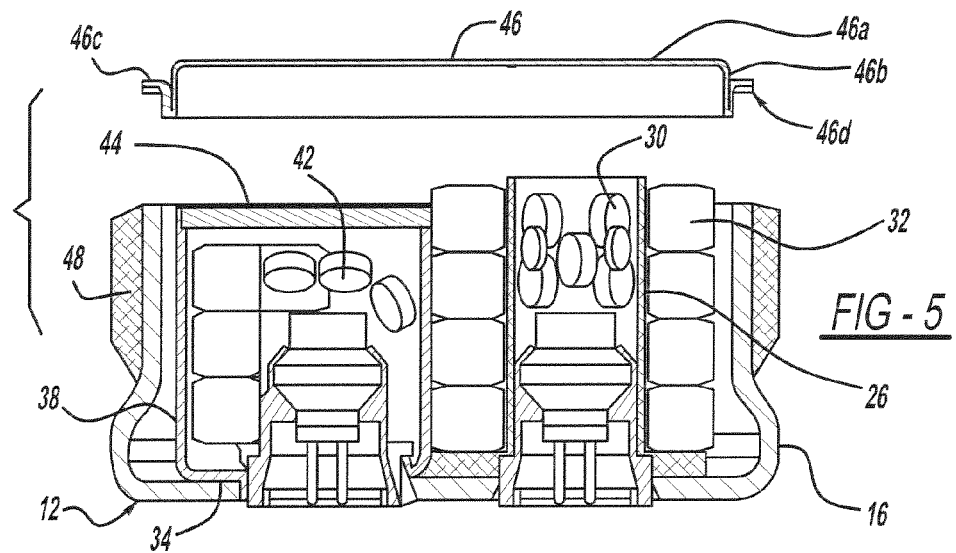
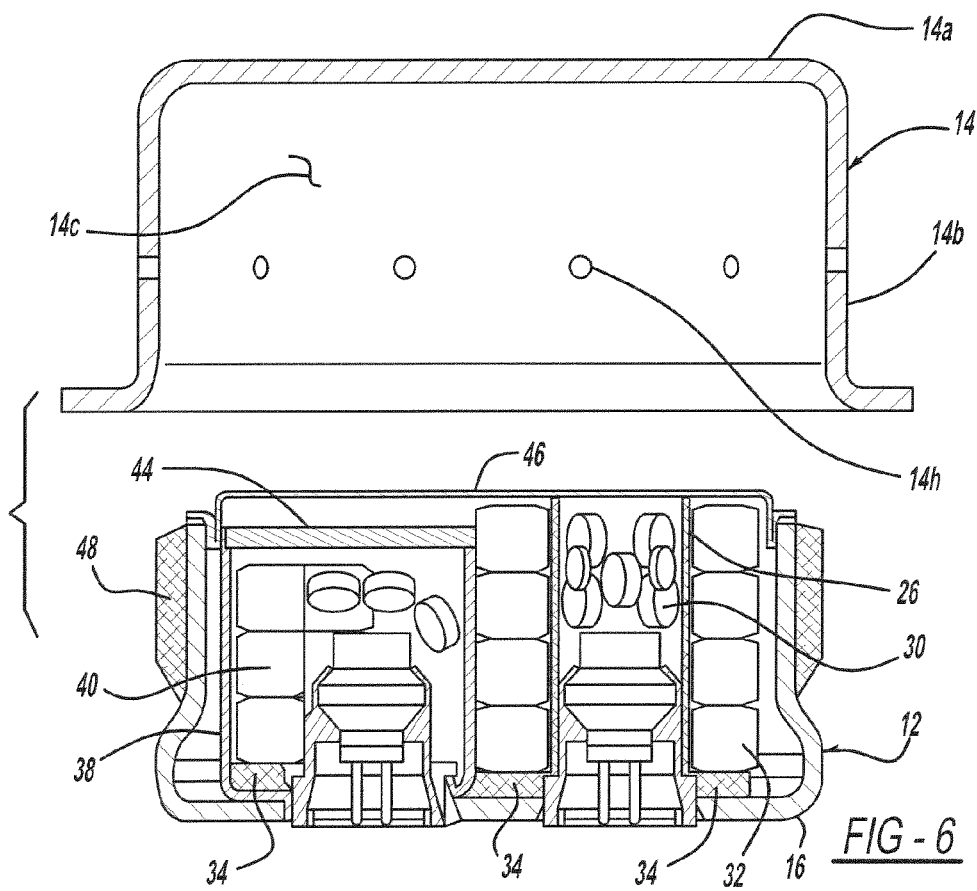

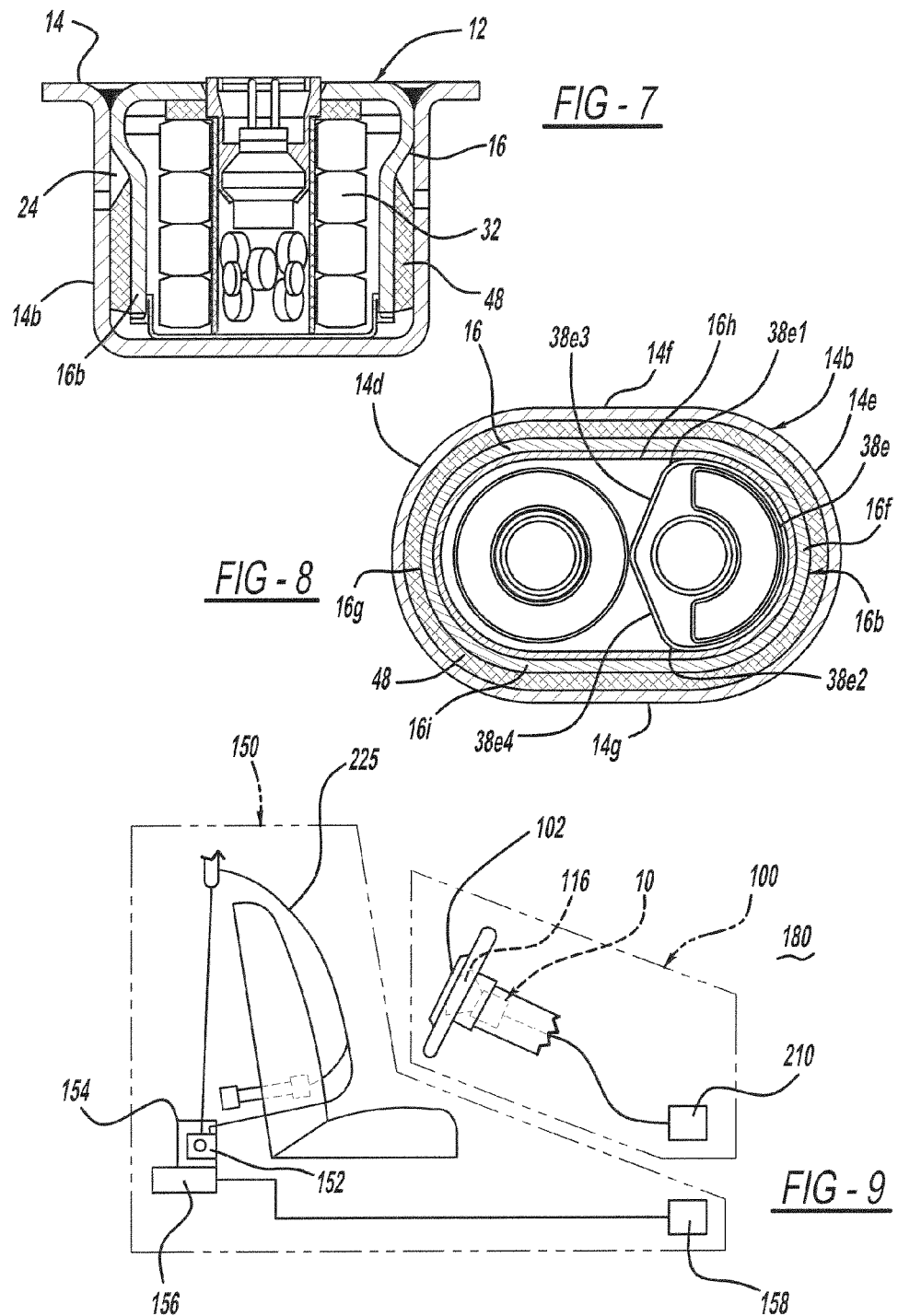

MULTI-CHAMBER GAS GENERATING SYSTEM

CROSS-REFERENCE TO RELATED APPLICATIONS

This application claims the benefit of U.S. Provisional. Application Ser. No. 61/217,272 filed on May 29, 2009.

BACKGROUND OF THE INVENTION

The present invention relates to gas generating systems and, more particularly, to a multi-chamber gas generating system.

SUMMARY OF THE INVENTION

In one aspect of the embodiments of the present invention, a gas generating system is provided including an outer housing portion defining a chamber therein, an end closure coupled to the housing portion to close the chamber, and a resilient seal positioned between the housing portion and the end closure to seal the chamber. The system is configured to permit a flow of pressurized gas from the chamber to an exterior of the outer housing portion along at least a portion of the seal.

In another aspect of the embodiments of the present invention, a gas generating system is provided including an outer housing portion defining a gas generating combustion chamber therein. An end closure is coupled to the housing portion to close the chamber. A resilient seal is positioned between the housing portion and the end closure to prevent fluid communication between the chamber and an exterior of the outer housing portion prior to activation of the gas generating system.

BRIEF DESCRIPTION OF THE DRAWINGS

In the drawings illustrating embodiments of the present invention:

FIG. 5 is an exploded cross-sectional view showing another portion of the embodiment shown in FIG. 2.

FIG. 6 is an exploded cross-sectional view showing another portion of the embodiment shown in FIG. 2.

FIG. 7 is a cross-sectional view of the embodiment shown in FIG. 1 taken along line 7-7.

FIG. 8 is a cross-sectional view of the embodiment shown in FIG. 1 taken along line 8-8.

FIG. 9 is a schematic representation of an exemplary vehicle occupant protection system incorporating a gas generating system in accordance with an embodiment of the present invention.

DETAILED DESCRIPTION

Figure 1:
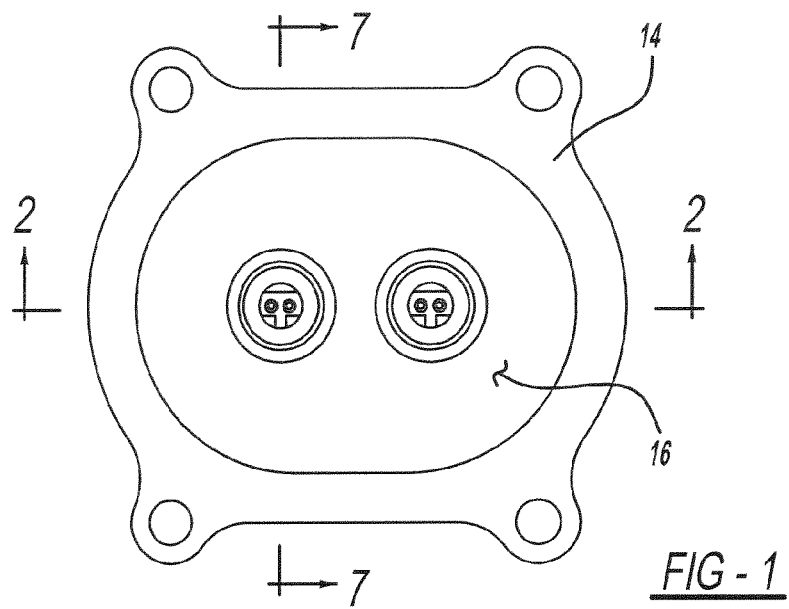
FIG. 1 is a plan view of a gas generating system in accordance with one embodiment of the present invention.

FIGS. 1-8 show cross-sectional views of a multi-chamber gas generating system 10 and elements thereof. System 10 includes an outer housing sub-assembly 12 and a first outer housing portion 14 secured to the outer housing sub-assembly so as to form a substantially hermetic seal therebetween.

As seen in the drawings, first outer housing portion 14 has a base portion 14a and a wall 14b extending along a circumference of the base portion to define a chamber 14c for receiving outer housing sub-assembly 12 therein. As seen in FIG. 8, first outer housing portion wall 14b includes a pair of opposed semi-circular end portions 14d and 14e connected by a pair of substantially parallel walls 14f and 14g. Wall 14h has one or more gas exit apertures 14h formed therealong which enable fluid communication between an interior of the gas generating system housing and an exterior of the housing after activation of the gas generating system. First outer housing portion 14 may be formed from a metal, metal alloy, or other suitable material using known methods.

Figure 3:
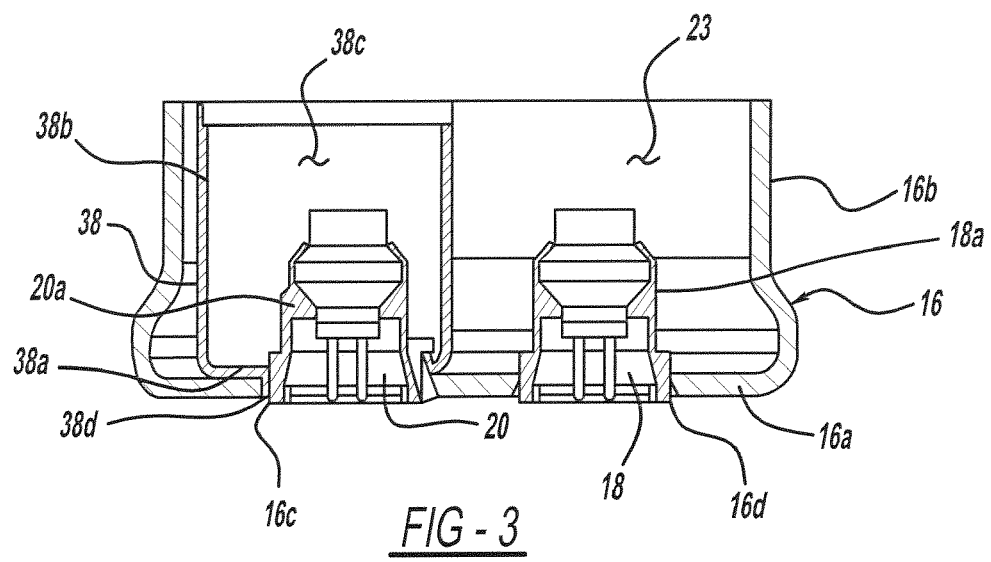
FIG. 3 is a cross-sectional view showing a portion of the embodiment shown in FIG. 2.

FIG. 3 is a cross-sectional view showing a portion of the elements positioned within second outer housing portion 16. Outer housing sub-assembly 12 includes a second outer housing portion 16 having a base portion 16a and a wall 16b extending along a circumference of the base portion to define a chamber 23 therein. Base portion 16a has first and second openings 16c and 16d for receiving respective first and second initiator assemblies 18 and 20 (described below) therein. First and second outer housing portions 14 and 16 combine to form a housing defining an enclosure containing other elements of the gas generating system.

As seen in the drawings, second outer housing portion wall 16b is shaped similarly to first outer housing portion wall 14b and has a pair of opposed semi-circular end portions 16f and 16g connected by a pair of substantially parallel walls 16h and 16i. The features of first outer housing portion 14 and second outer housing portion 16 are sized so as to enable second outer housing portion 16 to be nested or received within outer housing portion 14.

In addition, second outer housing portion wall 16b is dimensioned in relation to first outer housing portion wall 14b such that an edge 16m of wall 16b is spaced apart from first outer housing portion base portion 14a when the second outer housing portion is assembled to the first outer housing portion. This provides a flow path from the housing interior to gas exit openings 14h for generated gases exiting the housing. Also, second outer housing portion wall 16b is dimensioned in relation to first outer housing portion wall 14h such that at least a portion of the length of second outer housing portion wall 16b is spaced apart from a portion of the length of first outer housing portion wall 14b when the second outer housing portion is assembled to the first outer housing portion. This provides a gap 24 between the walls 14b and 16b which enables positioning of a filter (described below) therein. In the embodiment shown in the drawings, a portion of wall 16b slopes or jogs radially inwardly and then extends substantially parallel to wall 14b of first outer housing portion 14. Second outer housing portion 16 may be formed from a metal, metal alloy, or other suitable material using known methods.

In the embodiment shown in the drawings, first initiator assembly 18 extends through first outer housing portion opening 16d and includes a shell and an initiator 18b crimped or otherwise secured to the shell so as to enable fluid communication between the initiator and chamber 23 upon activation of the initiator 18b. Initiator 18b may be formed as known in the art. One exemplary igniter construction is described in U.S. Pat. No. 6,009,809, herein incorporated by reference. An o-ring seal or other suitable seal (not shown) may be positioned along an interface between the initiator and the shell 18a to form a hermetic seal between the in initiator and the shell. Shell 18a is welded or otherwise suitably secured to second outer housing portion.

Figure 4:
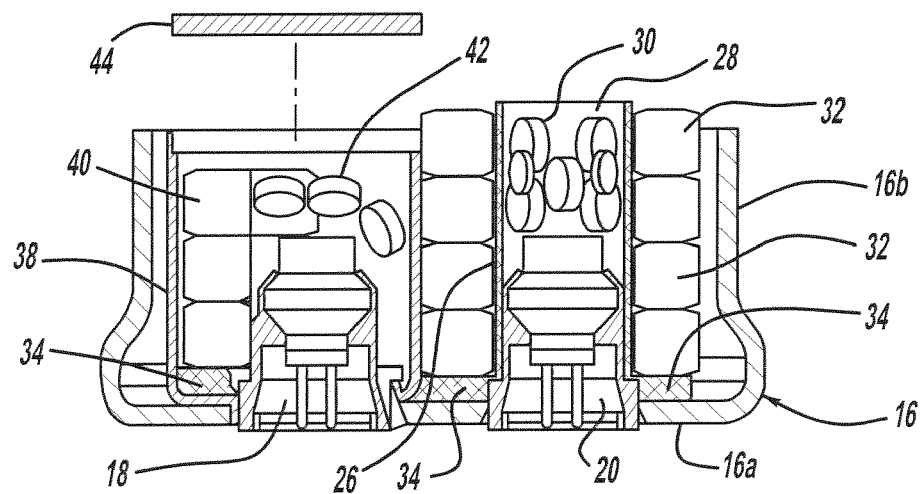
FIG. 4 is an exploded cross-sectional view showing another portion of the embodiment shown in FIG. 2.

FIG. 4 is an exploded cross-sectional view showing additional elements positioned within second outer housing portion 16. A tube 26 may be positioned within the gas generating system to enclose the portion of first initiator assembly 18 extending into chamber 23, thereby forming a cavity 28 for receiving a booster material 30 therein. Tube 26 is generally cylindrical and is secured to second outer housing portion 16 and/or to first initiator assembly shell 18a by welding or any other suitable method. Tube 26 has at least one opening formed therein to enable fluid communication between cavity 28 and an exterior of the tube 26 upon activation of the gas generating system. Tube 26 may be extruded, roll formed, or otherwise metal formed and may be made from carbon steel, stainless steel, or any other suitable material. In a particular embodiment, tube 26 is formed from a thermally-conductive material to facilitate heat transfer between a heat-activated auto-ignition material (not shown) and a portion of the gas generating system housing in thermal contact with tube 26 and exposed to elevated temperatures occurring on the exterior of the housing, due to a fire for example, ignition of the auto-ignition material produces ignition of booster material 30 or gas general generate material in thermal communication with the auto-ignition material, in a manner known in the art.

A plurality of gas generant wafers 32 are stacked around and adjacent tube 26. In the embodiment shown in the drawings, wafers 32 are annular in shape and each wafer 32 has substantially the same dimensions. However, the wafers may have any of a variety of alternative shapes positionable within cavity 28. Examples of gas generant compositions suitable for use in the present invention are disclosed in U.S. Pat. Nos. 5,035,757, 6,210,505, and 5,872,329, incorporated herein by reference. However, the range of suitable gas generants is not limited to that described in the cited patents.

Figure 2:
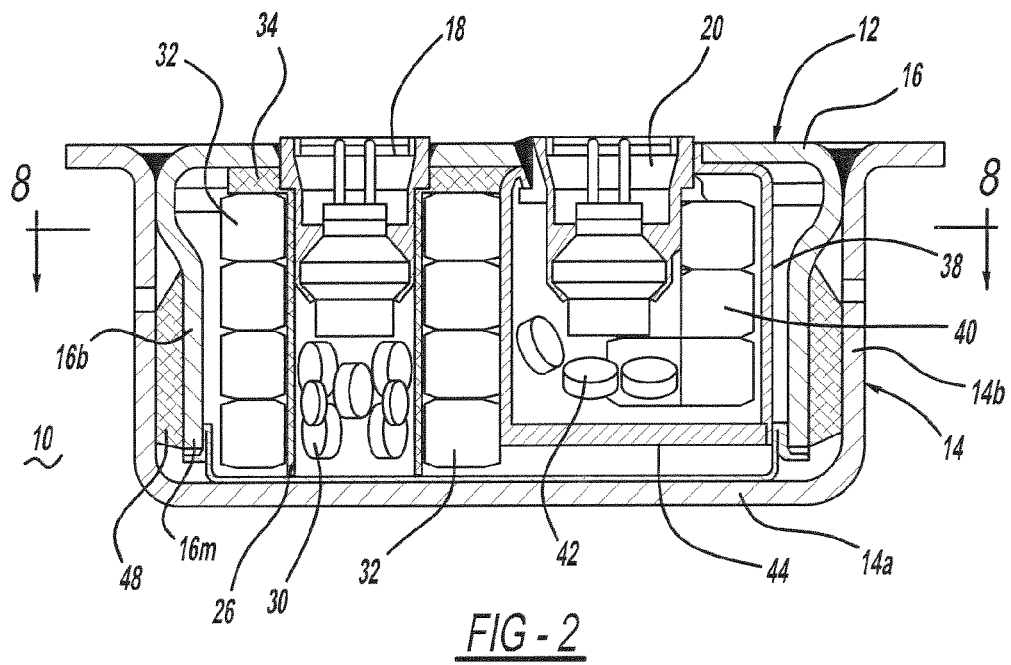
FIG. 2 is a cross-sectional view of the embodiment shown in FIG. 1 taken along line 2-2.

Referring to FIG. 2, appropriately shaped pads or cushions 34 may be provided at one or more ends of the stack of gas generant wafers 32 for holding the gas generant wafers in place and/or for cushioning the gas generant wafers against vibration and impact. Cushions 34 may be formed from a ceramic fiber material, for example.

A known booster material 30 may be positioned in cavity 28 to facilitate combustion of gas generant 32, in a manner known in the art. Activation of initiator 18b produces combustion of the booster material, thereby effecting ignition of gas generant material 32 in a manner known in the art.

A quantity of a known heat-activated auto-ignition material (not shown) may be positioned within the gas generating system so as to enable fluid communication between the auto-ignition material and any associated gas generant material and/or any associated booster material upon activation of the gas generating system. The auto-ignition material is a pyrotechnic material which is ignited by exposure to a temperature lower than the ignition temperature of the associated gas generant. As stated previously and as is known in the art, the auto-ignition material is ignited by heat transmitted from an exterior of the system housing to the interior of the housing due to an elevated external temperature condition (produced, for example, by a fire). Combustion of the auto-ignition material results in combustion of the associated gas generant, either directly or through intervening combustion of a booster material. Suitable auto ignition materials are known to those skilled in the art. Examples of suitable auto-ignition materials are nitro-cellulose based compositions and gun powder.

A first inner housing portion 38 is positioned and secured within second outer housing portion 16 by welding or some other suitable method. First inner housing portion 38 has a base portion 38a and a wall 38b extending from a circumference of the base portion to define a chamber 38c. An opening 38d is formed in base portion 38a for receiving second initiator assembly 20 therein.

Referring to FIGS. 2 and 8, in the embodiment shown in the drawings, wall 38b has a semi-circular portion 38e with ends 38e1 and 38e2, and a respective straight portion 38e3 and 38e4 extending from each of ends 38e1 and 38e2. Straight portions 38e3 and 38e4 intersect and combine with semi-circular portion 38e to help define chamber 38c. First inner housing portion 38 may be formed from a metal, metal alloy, or other suitable material using known methods.

In the embodiment shown in the drawings, second initiator assembly 20 extends through second outer housing portion opening 16c and first inner housing portion opening 38d. Second initiator assembly 20 includes a shell 20a and an initiator 20b crimped or otherwise secured to the shell so as to enable fluid communication between the initiator and chamber 38c upon activation of the initiator. Initiator 20b may be formed as known in the art. One exemplary igniter construction is described in U.S. Pat. No. 6,009,809, herein incorporated by reference. An o-ring seal or other suitable seal (not shown) may be positioned along an interface between the initiator and the shell 20a to form a hermetic seal between the in initiator and the shell. Shell 20a is welded or otherwise suitably secured to second outer housing portion 16 and/or to first inner housing portion 38. In the embodiment in the drawings, a common weld secures together second outer housing portion 16, first inner housing portion 38, and second initiator assembly shell 20a.

A plurality of gas generant wafers 40 are stacked around and adjacent a portion of second initiator assembly 20 projecting into chamber 23. In the embodiment shown in the drawings, wafers 40 are semi-circular in shape and each wafer has substantially the same dimensions. However, the wafers may have any of a variety of alternative shapes positionable within chamber 38c. Examples of gas generant compositions suitable for use in the present invention are disclosed in U.S. Pat. Nos. 5,035,757, 6,210,505, and 5,872,329, incorporated herein by reference. However, the range of suitable gas generants is not limited to that described in the cited patents. Gas generant material 40 may be the same as gas generant material 32 previously described, or gas generant materials 32 and 40 may be different materials.

A quantity of a known booster material 42 is positioned within second outer housing portion chamber 38c so as to enable fluid communication with second initiator assembly 20 upon activation of the second initiator assembly. Activation of initiator 20b produces combustion of the booster material, producing ignition of gas generant composition 40 in a manner known in the art.

Referring to FIGS. 2 and 4, appropriately shaped pads or cushions 34 may be provided at one or more ends of the stack of gas generant wafers 40 for holding the gas generant wafers in place and/or for cushioning the gas generant wafers against vibration and impact. Cushions 34 may be formed from a ceramic fiber material, for example.

A second inner housing portion 44 is welded or otherwise suitably attached to first inner housing portion 38 to form a substantially hermetically sealed enclosure for the system elements contained in cavity 38c. FIG. 4 shows second inner housing portion 44 prior to attachment to first inner housing portion 38. Second inner housing portion 44 has one or more gas exit openings formed therein to enable fluid communication between cavity 38c and an exterior of first inner housing portion 38 after activation of second initiator assembly 20. Second inner housing portion 44 may be formed from a metal, metal alloy, or other suitable material using known methods.

FIG. 5 is an exploded cross-sectional view showing additional elements operatively coupled to or positioned within second outer housing portion 16. FIG. 6 is an exploded cross-sectional view showing an embodiment of the gas generating system prior to insertion of outer housing sub-assembly 12 into first outer housing portion 14. Referring to FIG. 5, a second inner housing portion end closure 46 is provided for closing the second outer housing portion chamber 23. As seen in FIG. 5, end closure 46 includes a base 46a, a wall 46b extending along a periphery of the base, and a flange 46c projecting from the wall. FIG. 5 shows end closure 46 prior to attachment to second outer housing portion 16.

A seal 46d is positioned between the end closure 46 and the second outer housing for substantially hermetically sealing the second outer housing portion chamber 23. Seal 46d is structured so as to substantially prevent entry of contaminants into the second outer housing portion prior to activation of the gas generating system. Seal 46c may be an o-ring seal or may be formed from any resilient gasket material.

In the embodiment shown in FIGS. 1, 2, and 8, base 46a, wall 46b, flange 46c, and seal 46d are shaped or incorporated into a pair of opposed semi-circular end portions (not shown) connected by a pair of substantially parallel straight portions (not shown), in order to conform to the general shape of the second outer housing portion 16. The closure end portions and straight portions are dimensioned with respect to second outer housing portion wall 16b such that the end closure engages wall 16b with seal 46d abutting edge 16m of wall 16b when the end closure is mounted to the second outer housing portion 16. Seal 46d prevents the ingress of water vapor and other contaminants into the second outer housing portion prior to activation of the gas generating system.

In the embodiment shown in the drawings, end closure 46 engages second outer housing portion wall 16b in an interference fit sufficient to retain the end closure in position until second outer housing portion 16 is inserted into first outer housing portion 14 and secured therein, at which point the end closure is maintained in its position by abutment with first outer housing portion. In an alternative embodiment, the seal 46d is attached to the second outer housing portion 16 rather than to the end closure 46.

The gas generating system is configured to permit a flow of pressurized gas from the chamber 23 to an exterior of the outer housing portion 16 along at least a portion of the seal after activation of the gas generating system. To this end, seal 46d may be configured to fail in any of a variety of modes. Failure of the seal is understood to occur when the seal no longer positioned to, configured to, and/or structurally capable of preventing fluid communication between the chamber 23 and the exterior of outer housing portion 16.

In another particular embodiment, flange 46c is resiliently deflectable under pressure from gases generated by combustion of one or more of gas generants 32 and 40. Deflection of the flange produces displacement of at least a portion of the seal 46d, creating an opening for the release of gases between the seal and second outer housing portion wall 16b.

In another particular embodiment, seal 46d is structured so as to substantially prevent entry of contaminants into the second outer housing portion, but is sufficiently deflectable under the pressure of generated gases to permit formation of a gap between the seal and the second outer housing portion wall 16b to allow passage of gases therethrough.

In another particular embodiment, seal 46d is structured and/or attached to the end closure (or outer housing portion 16) an as to at least partially detach from the end closure (or outer housing portion 16) or to otherwise move under pressure from the generated gases, to permit the formation of a gap between the seal and the second outer housing portion wall 16b allowing passage of gases therethrough. The seal detaches or otherwise moves from a first position in which it blocks fluid communication between the chamber 23 and an exterior of the second outer housing portion 16, to a second position in which it fails to block fluid communication between the chamber 23 and the exterior of the second outer housing portion 16.

In another particular embodiment, seal 46d is formed from a material which fractures, decomposes, abrades, or otherwise structurally fails to impair at least a portion of the seal upon exposure to the generated gases, to permit the formation of a gap between the seal and the second outer housing portion wall 16b to allow passage of gases therethrough.

Such parameters as the dimensions of the seal, the material(s) from which the seal is formed, and the method of attaching the seal to the end closure 46 or to outer housing portion 16 may be specified by taking into consideration factors such as the temperature, pressure and chemical composition of the gases to which the seal will be exposed, as well as other pertinent factors.

A filter 48 may be incorporated into the inflator design for filtering particulates from gases generated by combustion of gas generant materials 32 and 40. In general, filter 48 is positioned between the gas generant materials positioned in the housing and any gas exit apertures 20 formed along inflator first outer housing portion 14. In the embodiment shown in the drawings, filter 48 is positioned in gap 24 between first and second outer housing portions 14 and 16, along a gas flow path between the housing interior and gas exit openings 14h formed in first outer housing portion 14. The filter may be formed from one of a variety of materials (for example, a carbon fiber mesh or sheet) known in the art for filtering gas generant combustion products.

As seen from the drawings in conjunction with the above description, the gas generating system described includes two separate combustion chambers, generally designated 38c and 23, each including a separate stack or collection of gas generant material.

In operation, the gas generating system may used in a variety of modes, depending on the requirements of a particular application. In one operational mode, only the gas generant in chamber 23 is ignited, by activation of first initiator assembly 18 and the resulting ignition of booster material 30. The generated gases flow past the contaminant barrier provided by end closure 46 and end closure seal 46d and through filter 48, exiting the gas generating system through gas exit openings 14h.

In another operational mode, only the gas generant 40 within first inner housing portion 38 is ignited, by activation of second initiator assembly 20 and the resulting ignition of booster material 42. In this mode, the amount or type of gas generant 40 in first inner housing portion 38 is generally specified so as to produce either more or less gas upon combustion than the gas generant 32 in chamber 23. This difference in gas generating capability and the ability to combust gas generants 32 and 40 separately enhances the flexibility of the gas generating system. The generated gases flow through the openings in second inner housing portion and past the contaminant barrier provided by end closure 46 and end closure seal 46d and through filter 48, exiting the gas generating system through gas exit openings 14h.

In another operational mode, the gas generant materials 32 and 40 in chambers 23 and 38c are ignited in a specific sequence for phased deployment, depending on the requirements of a particular application.

In another operational mode, the gas generant materials 32 and 40 in chambers 23 and 38*c* are ignited simultaneously, to provide maximum generation and flow of gas, depending on the requirements of a particular application.

Referring to FIG. 9, in a particular application, an embodiment of a gas generating system 10 incorporating the features described above is incorporated into an airbag system 100. Airbag system 100 comprises a housing 102 having a rupturable frontal closure 114, an airbag 116, and a gas generating system 10 in accordance with an embodiment of the present invention. Airbag system 100 may include (or be in communication with) a crash event sensor 210 (for example, an inertia sensor or an accelerometer) including a known crash sensor algorithm that signals actuation of one or more of initiators 18*b* and 20*b* previously described.

Referring again to FIG. 9, any embodiment of a gas generating system 10 incorporating the features described above (or an airbag system including such a gas generating system) may be incorporated into a broader, more comprehensive vehicle occupant protection system 180 including additional elements such as, for example, a safety belt assembly 150. FIG. 9 shows a schematic diagram of one exemplary embodiment of such a protection system.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features disclosed herein are susceptible to a number of modifications commensurate with the abilities of one of ordinary skill in the art, none of which departs from the scope of the present invention as defined in the appended claims.

What is claimed is:

1. A gas generating system comprising:
an outer housing portion defining a chamber therein;
an end closure coupled to the housing portion to close the chamber; and
a resilient seal positioned between the housing portion and the end closure to seal the chamber, wherein the system is configured to permit a flow of pressurized gas from the chamber to an exterior of the outer housing portion along at least a portion of the seal.

2. The gas generating system of claim 1 further comprising another outer housing portion defining another chamber therein, wherein the seal is positioned within the other chamber.

3. The gas generating system of claim 2 wherein a part of the outer housing portion is spaced apart from the other outer housing portion to define a gap therebetween, and wherein the other outer housing portion includes at least one gas exit aperture 14*h* formed therein and positioned in the gap to enable fluid communication between the other chamber and an exterior of the other outer housing portion.

4. The gas generating system of claim 3 further comprising a filter positioned in the gap and interposed between the seam and the at least one gas exit aperture.

5. The gas generating system of claim 2 wherein the outer housing portion is coupled to the other outer housing portion so as to seal the other chamber.

6. The gas generating system of claim 1 wherein a portion of the end closure is configured to deflect responsive to pressurized gases generated in the chamber impinging on the portion of the end closure, so as to form a gap at the seam for release of the generated gases from the chamber.

7. The gas generating system of claim 1 wherein a portion of the seal is configured to deform responsive to pressurized gases generated in the chamber impinging on the portion of the seal, so as to form a gap at the seam for release of the generated gases from the chamber.

8. A gas generating system comprising:
an outer housing portion defining a chamber therein;
an end closure coupled to the housing portion to close the chamber; and
a resilient seal positioned between the housing portion and the end closure to seal the chamber, wherein the system is configured to permit a flow of pressurized gas from the chamber to an exterior of the outer housing portion along at least a portion of the seal,
wherein the seal is attached to one of the end closure and the outer housing portion, and wherein a portion of the seal is configured to detach from the of the end closure and the outer housing portion responsive to pressurized gases generated in the chamber impinging on the portion of the seal, so as to form a gap at the seam for release of the generated gases from the chamber.

9. A gas generating system comprising:
an outer housing portion defining a chamber therein;
an end closure coupled to the housing portion to close the chamber; and
a resilient seal positioned between the housing portion and the end closure to seal the chamber, wherein the system is configured to permit a flow of pressurized gas from the chamber to an exterior of the outer housing portion along at least a portion of the seal,
wherein the seal is attached to one of the end closure and the outer housing portion, and wherein a portion of the seal is configured to move from a first position between the end closure and the outer housing portion in which it blocks fluid communication between the chamber and an exterior of the second outer housing portion, to a second position in which the seal fails to block fluid communication between the chamber and the exterior of the second outer housing portion, so as to form a gap at the seam for release of the generated gases from the chamber responsive to pressurized gases generated in the chamber impinging on the portion of the seal.

10. The gas generating system of claim 1 wherein the seal is configured to fracture or decompose responsive to exposure to gases generated in the chamber, so as to form a gap at the seam for release of the generated gases from the chamber.

11. A gas generating system comprising:
an outer housing portion defining a chamber therein;
an end closure coupled to the housing portion to close the chamber; and
a resilient seal positioned between the housing portion and the end closure to seal the chamber, wherein the system is configured to permit a flow of pressurized gas from the chamber to an exterior of the outer housing portion along at least a portion of the seal, and
wherein the outer housing portion includes a pair of opposed semi-circular end portions connected by a pair of substantially parallel walls.

12. A vehicle occupant protection system comprising a gas generating system in accordance with claim 1.

13. An airbag system comprising a gas generating system in accordance with claim 1.

14. The gas generating system of claim 1 further comprising a gas generant material positioned in the chamber for use in generating the pressurized gas.

15. A gas generating system comprising:
an outer housing portion defining a gas generant combustion chamber therein;
an end closure coupled to the housing portion to close the chamber; and
a resilient seal positioned between the housing portion and the end closure to prevent fluid communication between the chamber and an exterior of the outer housing portion prior to activation of the gas generating system.

16. A vehicle occupant protection system comprising a gas generating system in accordance with claim 15.

17. An airbag system comprising a gas generating system in accordance with claim 15.

18. The gas generating system of claim 1 wherein the system is configured to enable formation of a gap between the seal and at least one of the housing portion and the end closure responsive to exposure of the seal to generated gases, to permit the flow of pressurized gas through the gap.

* * * * *

UNITED STATES PATENT AND TRADEMARK OFFICE
CERTIFICATE OF CORRECTION

PATENT NO. : 8,240,709 B1  
APPLICATION NO. : 12/791155  
DATED : August 14, 2012  
INVENTOR(S) : Quioc Page 1 of 1

It is certified that error appears in the above-identified patent and that said Letters Patent is hereby corrected as shown below:

Col. 1, Line 30;   Delete "generating" and Insert --generant--.

Col. 2, Line 33;   Insert --first-- before outer.

Col. 2, Line 65;   Delete "in" before initiator.

Col. 3, Line 20;   Insert --.-- after example.

Col. 3, Line 20;   Insert --Ignition-- and Delete "ignition".

Col. 3, Line 22;   Delete "general".

Col. 3, Line 22;   Delete "generate" and Insert --generant--.

Col. 5, Line 65;   Delete "an" and Insert --so--.

Col. 8, Claim 8, Line 40;   Insert --one-- before of.

Signed and Sealed this  
Sixth Day of November, 2012

David J. Kappos  
*Director of the United States Patent and Trademark Office*